April 22, 1924.

J. D. KIRKHAM

TOP

Filed March 29, 1923    5 Sheets-Sheet 1

1,491,306

J. D. Kirkham
INVENTOR

BY Victor J. Evans
ATTORNEY

WITNESS:

April 22, 1924.

J. D. KIRKHAM

TOP

Filed March 29, 1923

J. D. Kirkham, INVENTOR

BY Victor J. Evans, ATTORNEY

WITNESS:

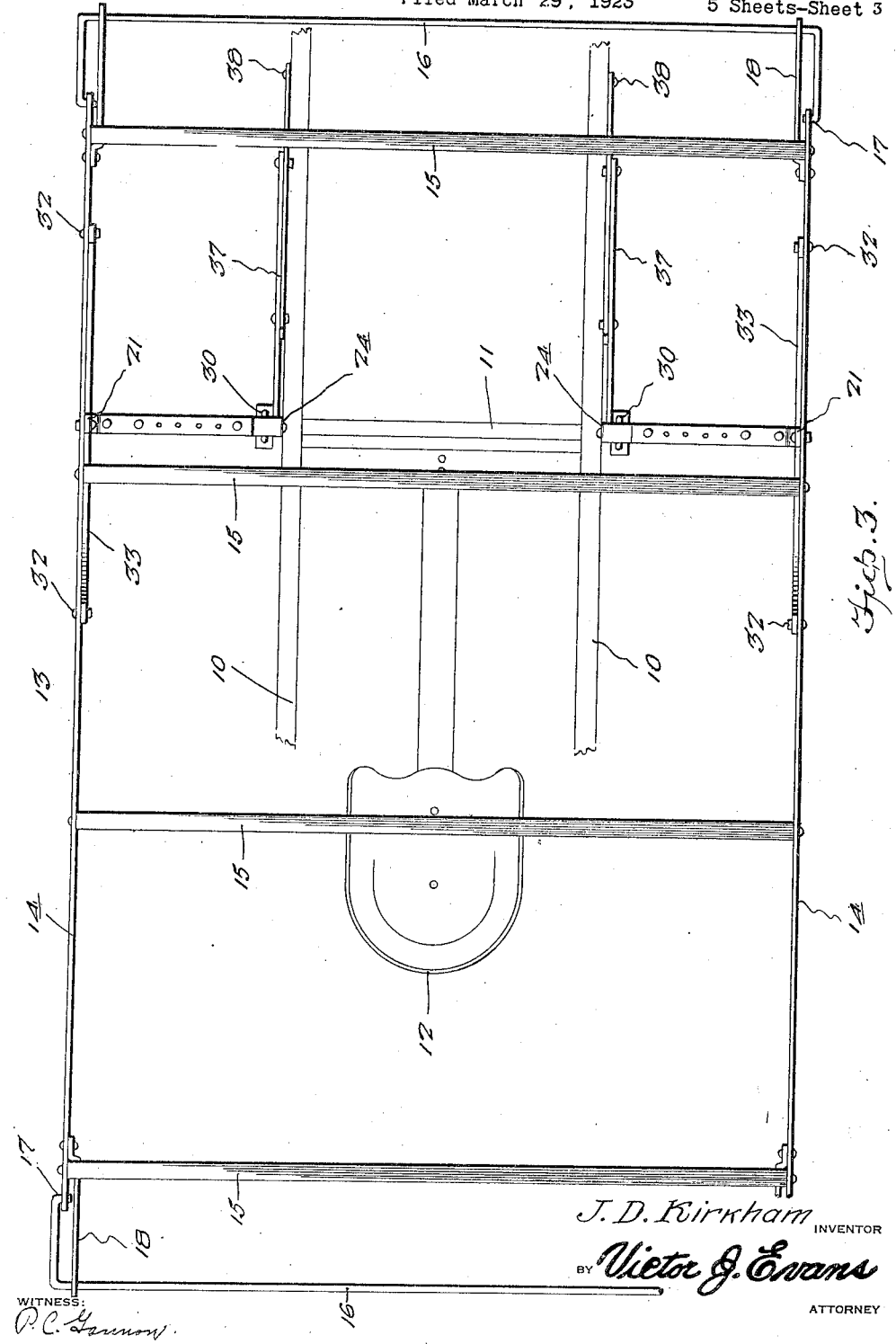

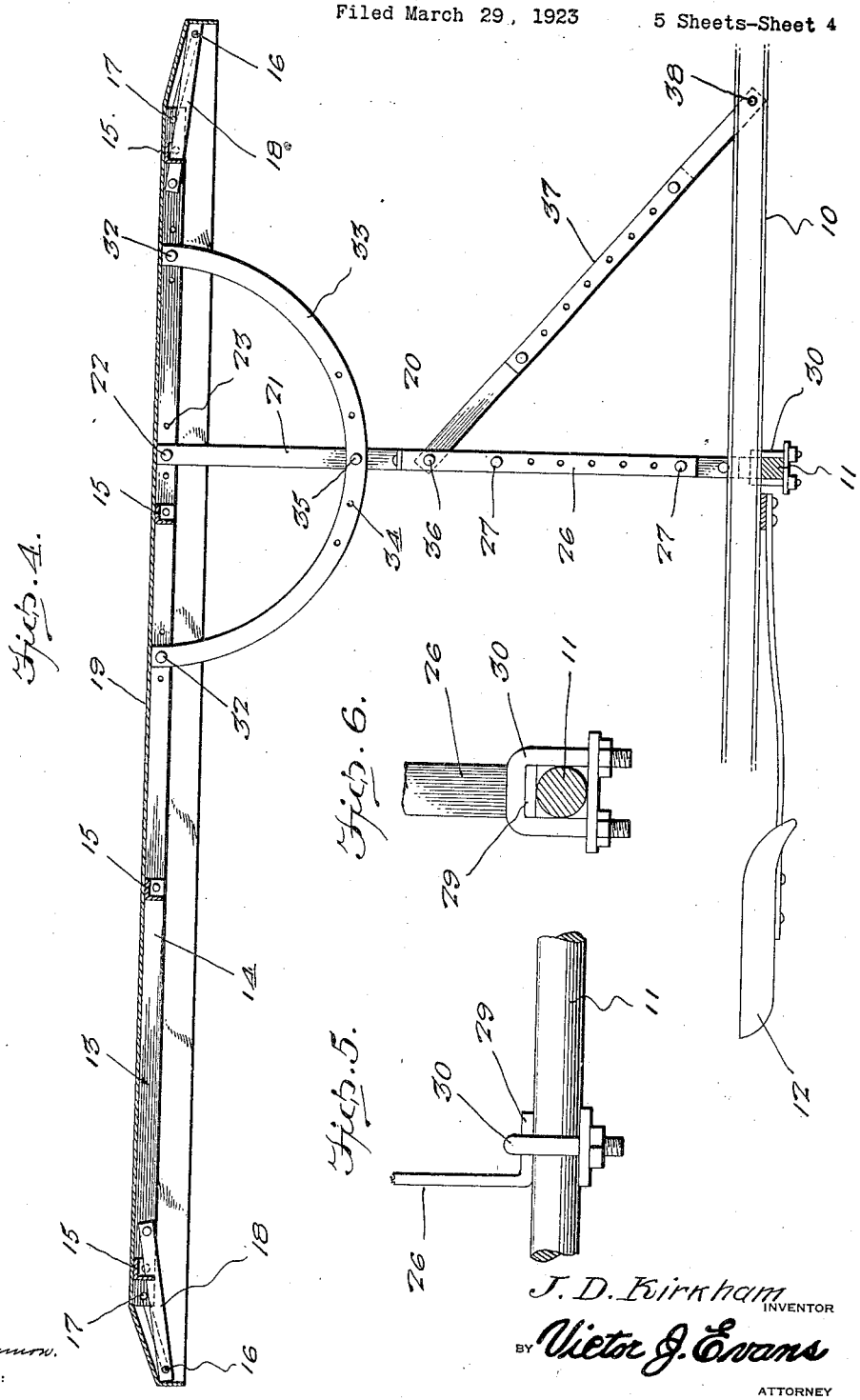

April 22, 1924.

J. D. KIRKHAM

TOP

Filed March 29, 1923

WITNESS:
Paul M. Hunt

J. D. Kirkham
INVENTOR
BY Victor J. Evans
ATTORNEY

Patented Apr. 22, 1924.

1,491,306

UNITED STATES PATENT OFFICE.

JAMES D. KIRKHAM, OF EL CENTRO, CALIFORNIA.

TOP.

Application filed March 29, 1923. Serial No. 628,579.

*To all whom it may concern:*

Be it known that I, JAMES D. KIRKHAM, a citizen of the United States, residing at El Centro, in the county of Imperial and State of California, have invented new and useful Improvements in Tops, of which the following is a specification.

This invention relates to tops or covers especially designed for attachment to agricultural machines, such as plows, tractors, planters and the like, an object of the invention being to provide a top or cover which may be detachably secured to motor driven machines (either stationary or movable) for the protection of the operator, may be attached to the tongue of an animal drawn vehicle for the protection of draft animals, or may be secured to the body of a person to provide a sun shade or umbrella.

Another object of the invention is the provision of a top or cover which is adjustable with respect to its supporting means, while the latter is also adjustable with respect to the top and to the machine or vehicle to which it is attached, so that the said top may be easily and quickly transferred from one machine to another and conveniently adjusted to suit the frame structure of different machines, whereby the said top may be used for a number of different purposes.

With the above and other objects in view, the invention further includes the following novel features and details of construction, to be hereinafter more fully described, illustrated in the accompanying drawings and pointed out in the appended claims.

In the drawings:—

Figure 3 is a plan view with the fabric removed from the cover frame.

Figure 4 is a longitudinal sectional view.

Figures 5 and 6 are detail views showing the manner of attaching the top to a transverse bar or axle.

Figure 1:
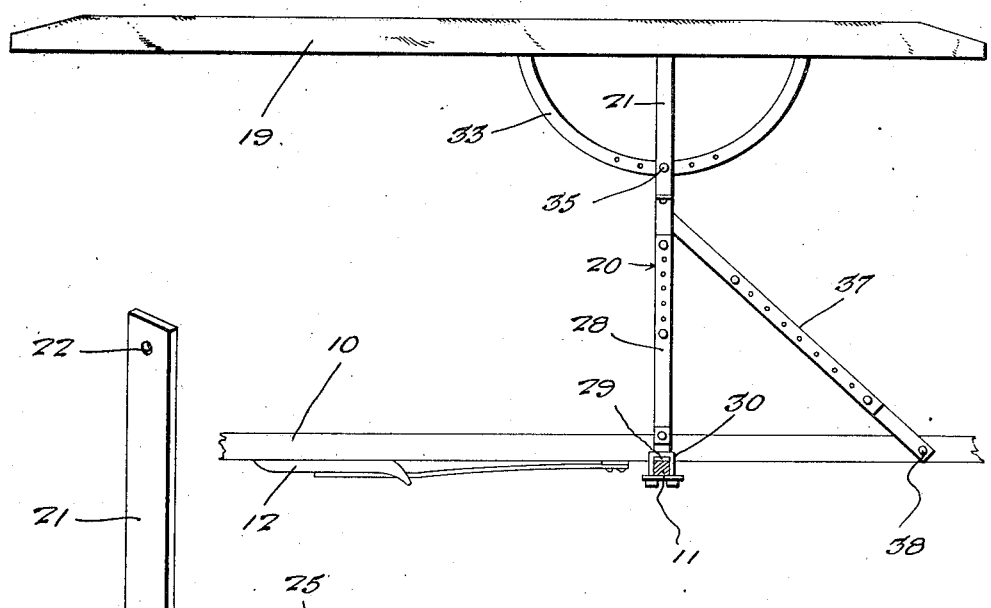
Figure 1 is an elevation showing a top constructed in accordance with the invention and attached to a plow, only a portion of the latter being illustrated.

Referring in detail to the drawings, wherein like characters of reference denote corresponding parts, the reference character 10 indicates a portion of the frame of a plow or other agricultural machine, whose axle is indicated at 11, while the operator's seat is shown at 12.

The invention which is designed for the purpose of protecting the operator from the heat of the sun is shown in position over the seat 12 and it may be here stated that while the invention is shown attached to a plow, it may also be used in connection with stationary machines, or may be attached to the tongue of an animal drawn machine or vehicle for the protection of draft animals.

For this purpose, the invention comprises a relatively light metal frame indicated generally at 13 and shown as including parallel side bars 14 and bows 15 which connect the side bars. If desired, one or both ends of the frame may have projecting therefrom substantially U-shaped extensions 16, whose inner ends are pivotally mounted within the ends of the side bars 14 as shown at 17, while braces 18 which connect the extensions 16 with the said side bars act to prevent pivotal movement of the former. The frame is adapted to be provided with a canvas or other fabric cover 19, suitably secured to the frame and which may if desired extend downward over each side edge.

The frame 13 has connected to the side bars 14, standards 20 which serve as a means for connection with the plow, or with other supporting means, depending upon the use to which the top is put. Each of the standards 20 is of sectional formation and includes a substantially L-shaped upper section 21, which is pivotally secured to one of the side bars 14 as shown at 22, each of the said side bars being provided with spaced openings 23, whereby the point of pivotal connection may be regulated. The horizontal arm of the section 21 is connected to the horizontal arm of an additional section 24 of the standard, the horizontal arms of the sections 21 and 24 being provided with spaced openings 25 for the passage of suitable fastening devices so that the sections 21 and 24 of both standards may be adjusted relatively. The vertical arm 24 of each of the standards is extensible so as to permit the height of the top to be regulated and for this purpose the said vertical arm includes an extension 26 which is adjustably secured in place by means of suitable fastening devices 27, which extend through registering openings provided in the vertical arm of the section 24 and its extension 26. Connecting the lower ends of the extension 26 and the section 21 of each of the standards is an extensible inclined brace 28, whose length may be regulated to suit the length of the vertical arm 24 and the horizontal arms of each section of the standard. The lower ends of the standards are each provided with a laterally extending foot 29, which may rest upon the axle 11 and may be secured in place by means of U-bolts or clips 30 as illustrated in detail in Figures 5 and 6 of the drawings.

Figures 8, 9:
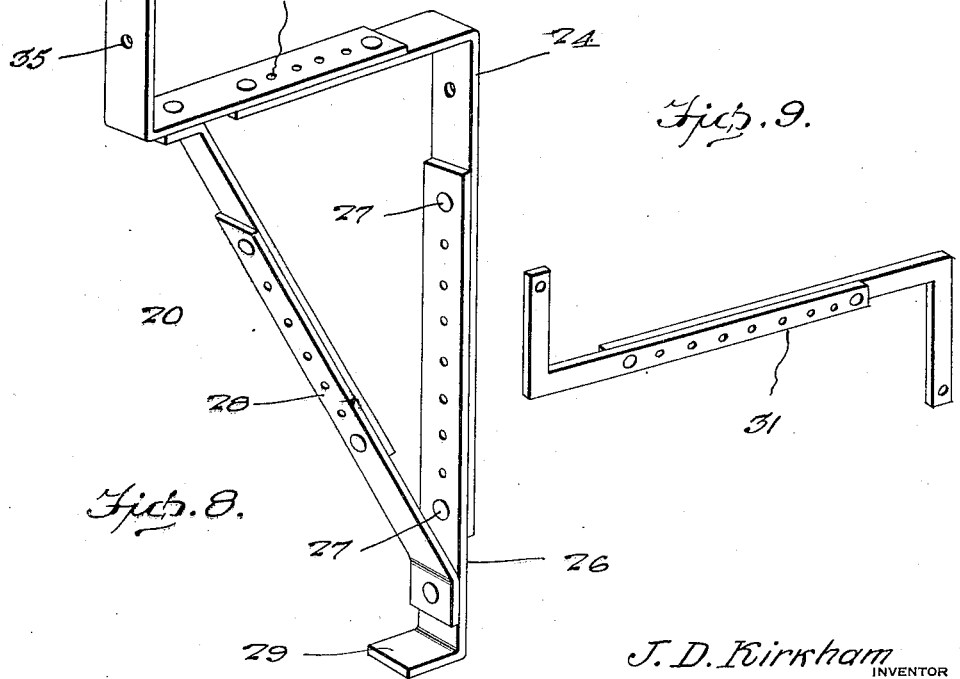
Figure 8 is a detail perspective view of one of the adjustable supporting standards.
Figure 9 is a similar view of the attaching means shown in Figure 7.
Figure 2:
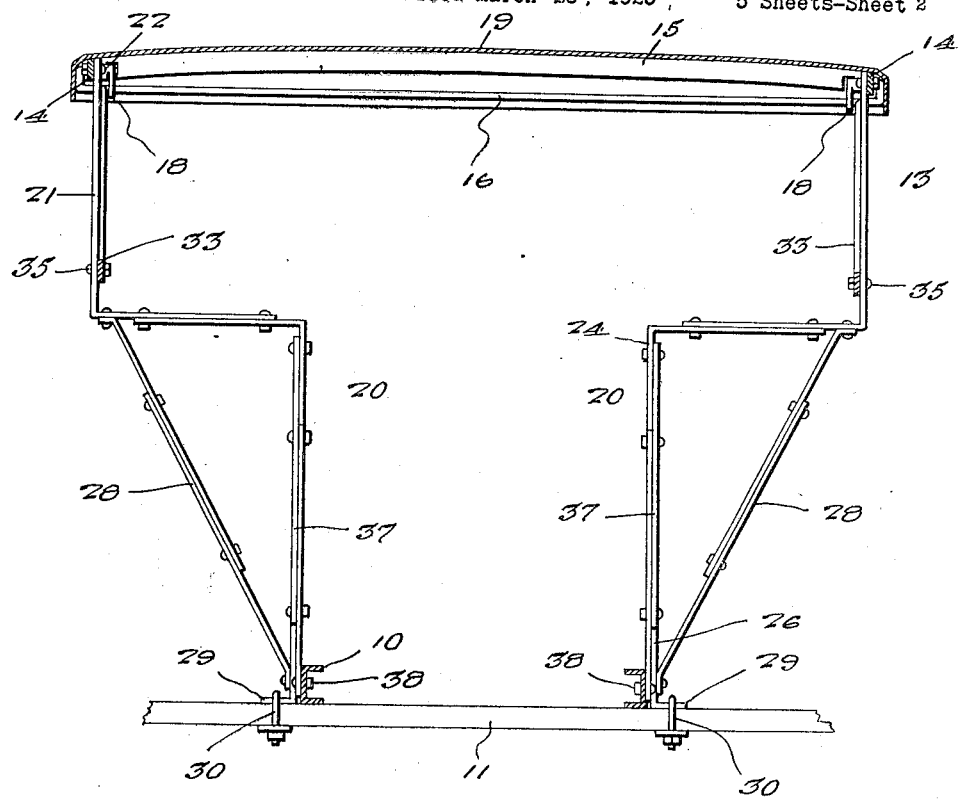
Figure 2 is a transverse sectional view of the same.
Figure 7:
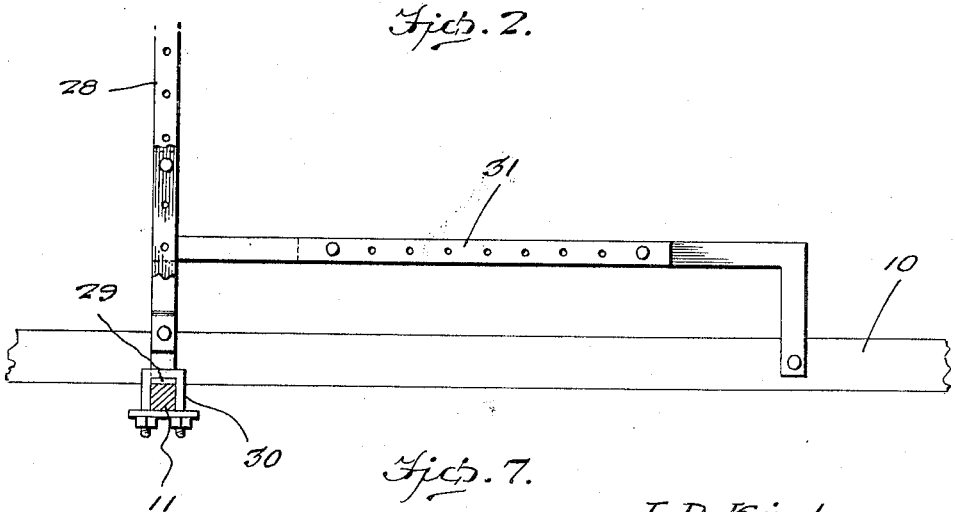
Figure 7 is an enlarged fragmentary view showing a different means of attaching the top.

In the event of the axle 11 not being conveniently positioned, there is provided a substantially Z-shaped extensible bracket 31, as shown in Figures 7 and 9. This bracket may be removably secured to the frame 10 or any convenient part of the supporting structure.

For the purpose of preventing pivotal movement of the frame 13 upon the standards, each of the side bars 14 has adjustably secured thereto as shown at 32, the opposite ends of a sector 33 and the latter is provided with spaced openings 34 which are adapted to register with an opening 35 provided in the standards and suitable fastening devices may be passed through these openings to hold the frame and standards against relative movement.

Secured to each of the standards 20 as shown at 36 are the upper ends of extensible braces 37, the lower end of which may be removably secured to the frame or other convenient portion of the plow as shown at 38. These braces are disposed longitudinally of the frame and may extend forward or rearward of the standards as desired, or one brace may extend forward and the other rearward. All of the connections are of a removable character so that the invention may be readily disassembled either for adjustment or for storage.

Figure 10:
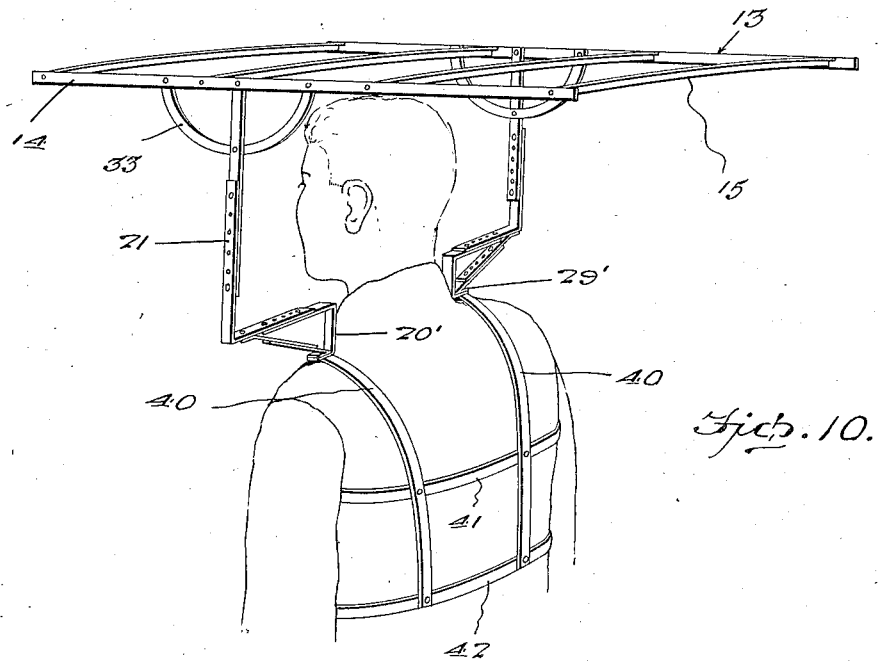
Figure 10 is a perspective view illustrating the invention in use as a sun shade or umbrella and showing the means of securing the same to the body of a man.
Figure 11:
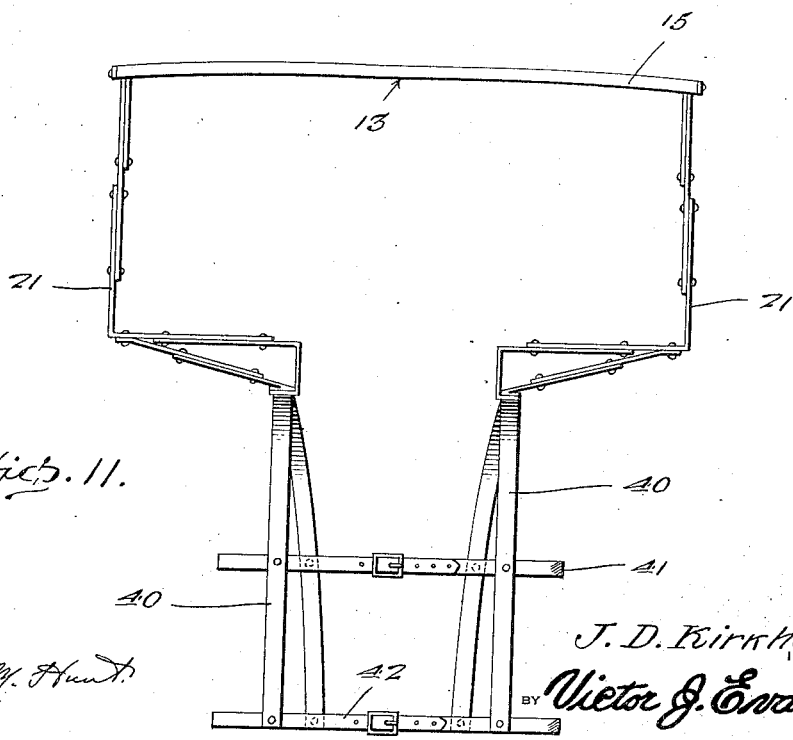
Figure 11 is a front elevation of the device shown in Figure 10.

In Figures 10 and 11 the invention is illustrated as secured directly to the body of a man. The construction of the top is substantially the same as previously described, except that the standards 20' are differently proportioned and the feet 29' have secured thereto spring steel straps 40. These straps engage over the shoulders of the user and their opposite lower ends are connected by spaced horizontally arranged straps 41 which meet in front and are adjustably connected by means of buckles 42. If desired, suitable padding may be provided for the protection of the user. When used in the manner illustrated in Figures 10 and 11, the top will afford excellent protection. It is constructed so as to be light and will leave both hands free.

It will be apparent from the foregoing description and accompanying drawings, that the top or cover may be used in connection with machines or vehicles of various constructions and may be horizontally arranged or may be tilted as desired. The top or cover is capable of adjustment as to its height and may also be horizontally adjusted to properly position it for the convenience of the operator, while the relative adjustment of the standards permits of their being attached to machines of various constructions.

The invention is susceptible of various changes in its form, proportions and minor details of construction and the right is herein reserved to make such changes as properly fall within the scope of the appended claims.

Having described the invention what is claimed is:—

1. A device of the class described comprising a cover embodying a rigid rectangular frame, said frame having oppositely arranged series of openings in its longitudinal side bars, supporting standards arranged at opposite sides of said frame, means for securing the standards to the cover by passing said means through selected oppositely arranged openings in the oppositely arranged central series of openings, segments secured to said standards below the upper ends thereof, said segments having their ends secured by means passing through said ends and oppositely arranged openings of the end series of openings, said segments having series of openings through their central portions, and said openings and securing means providing for pivotal adjustment of the cover and for bodily longitudinal adjustment thereof, relative to the standards.

2. A device of the class described comprising a cover, supporting standards at opposite sides of the cover, said cover bodily adjustable longitudinally with respect to said standards, and each of said standards comprising upper and lower reversibly disposed L-shaped sections secured together for lateral relative adjustment, a lower section adjustably secured to the depending arm of the lower L-shaped section, and adjustable inclined brace means connecting the horizontal arm of the upper section with the adjustable section for the lower section.

In testimony whereof I affix my signature

JAMES D. KIRKHAM.